May 15, 1956  V. A. LINK  2,745,536
BEAM AND CHANNEL TURNING DEVICES
Filed Feb. 4, 1953  3 Sheets-Sheet 1
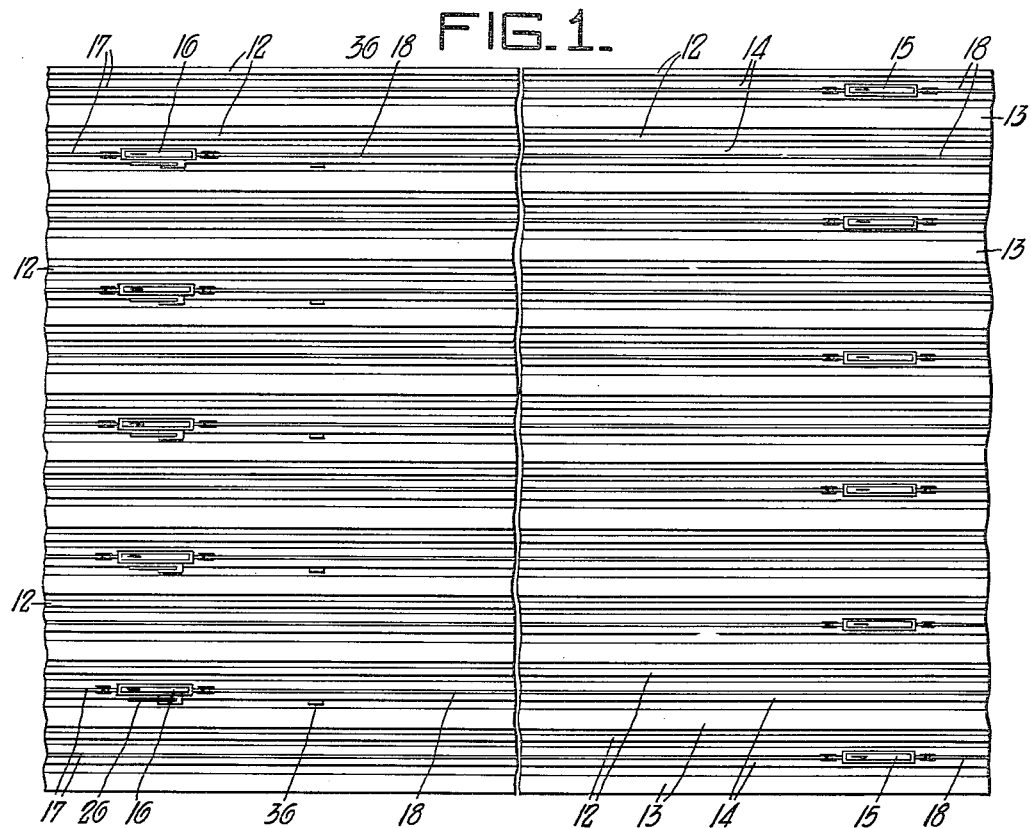
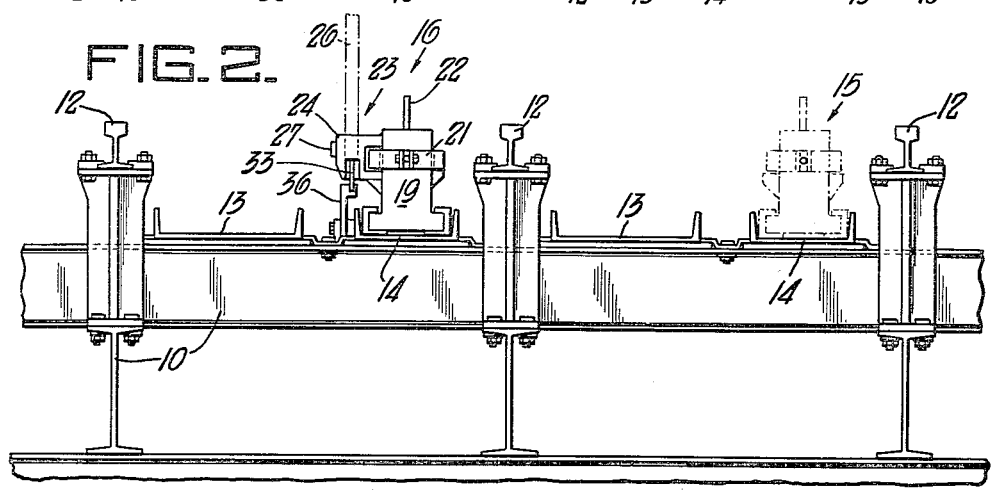
Inventor:
Victor A. Link,
by: Donald G. Dalton
his Attorney.

May 15, 1956  V. A. LINK  2,745,536
BEAM AND CHANNEL TURNING DEVICES
Filed Feb. 4, 1953  3 Sheets-Sheet 2
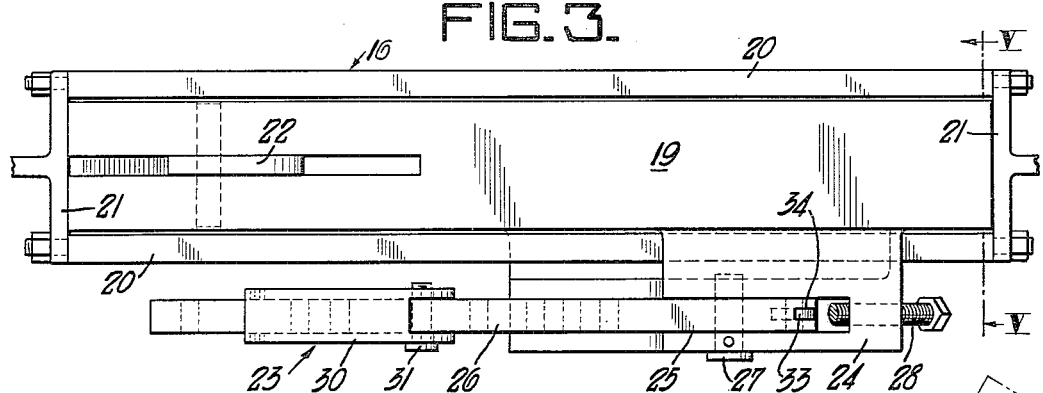
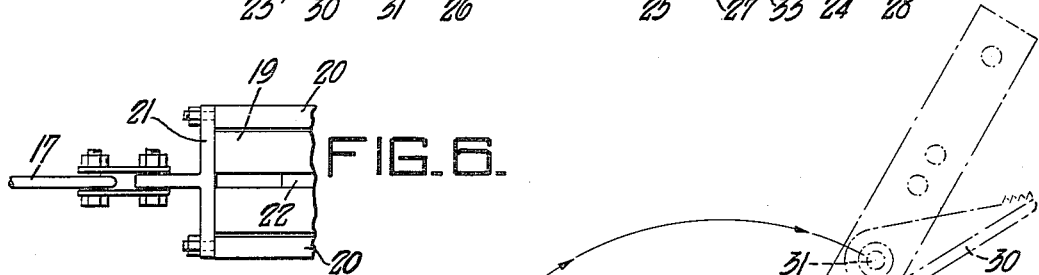
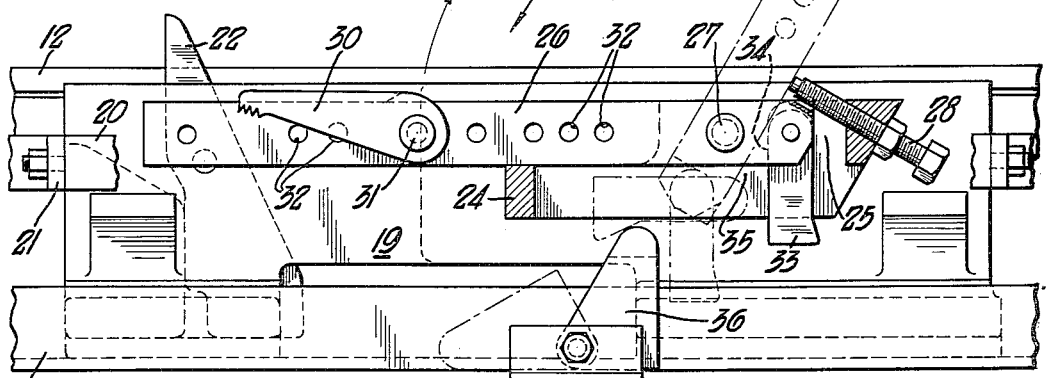
Inventor:
VICTOR A. LINK,
by: Donald G. Dalton
his Attorney.

May 15, 1956 V. A. LINK 2,745,536
BEAM AND CHANNEL TURNING DEVICES
Filed Feb. 4, 1953 3 Sheets-Sheet 3
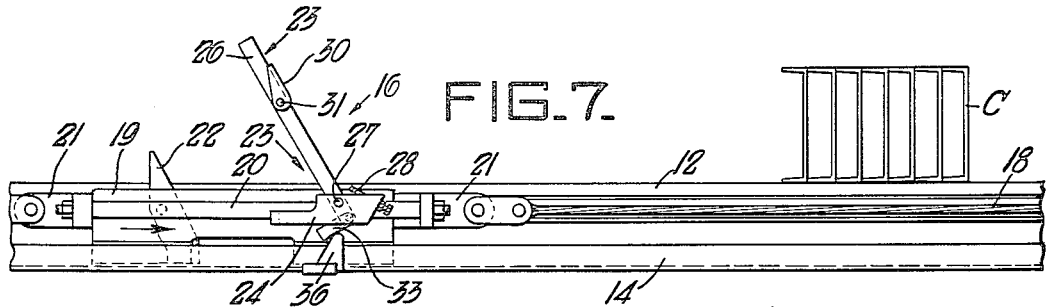
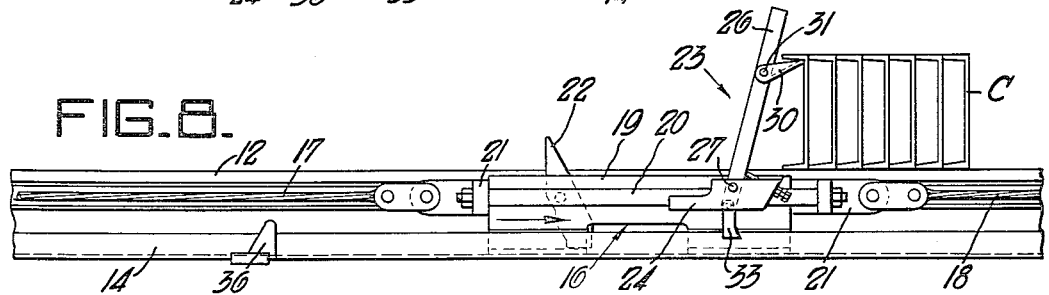
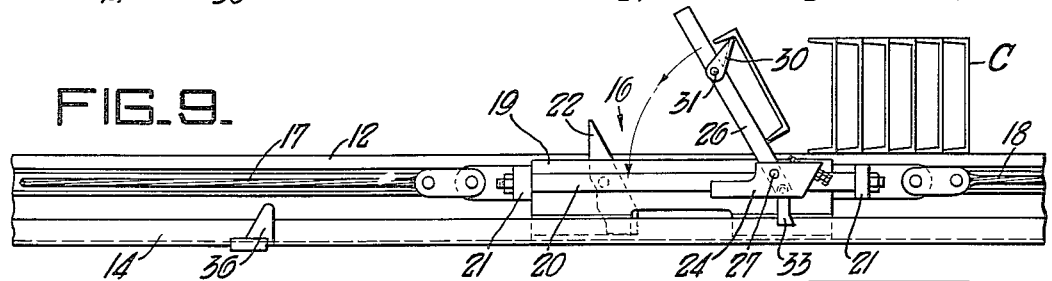
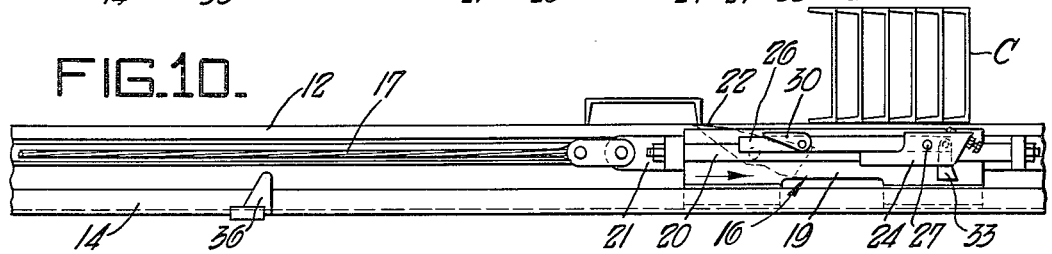
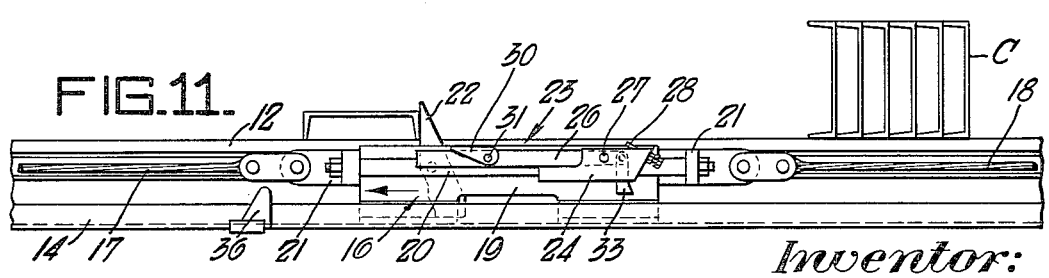
Inventor:
VICTOR A. LINK,
by: Donald G. Dalton
his Attorney United States Patent Office 2,745,536
Patented May 15, 1956

2,745,536

BEAM AND CHANNEL TURNING DEVICES

Victor A. Link, West Mifflin, Pa., assignor to United States Steel Corporation, a corporation of New Jersey Application February 4, 1953, Serial No. 335,147

8 Claims. (Cl. 198—33)

This invention relates to a device for turning structural members, such as channels or beams, on a hot bed.

In the steel making art a "hot bed" refers to a large horizontal bed on which hot-rolled shapes rest while cooling from their finishing temperature. The usual hot bed comprises a series of parallel rails or skids and movable carriages located between these rails. The hot shapes rest on the rails and are advanced therealong by movement of the carriages. Structural members contract while cooling, and unless restrained, their ends draw in toward the middle and produce camber. To minimize camber channels and beams commonly rest on a hot bed in upright position (webs vertical) with adjacent members abutting each other, an arrangement which has the further advantage of increasing bed capacity, since the webs usually are deeper than the flanges are wide. However, before leaving the bed, such members are turned down so that their webs are horizontal for delivery to subsequent straightening apparatus. The turning operation commonly is accomplished manually for small structural members or with an overhead crane and chain hook for larger members. Either procedure is unduly slow, costly and hazardous.

An object of the present invention is to provide a device which turns structural members automatically as they approach the exit end of a hot bed, thereby eliminating difficulties previously encountered in this operation.

A further object is to provide in combination with a hot bed a turning device which is mounted on a carriage of the bed and operates automatically to turn structural members on movement of the carriage.

A more specific object is to provide in combination with a hot bed a turning device which includes a lever pivoted to a carriage of the bed, a dog pivoted to this lever for engaging structural members, a resetting trigger pivoted to the lever, and an abutment fixed to the bed for operating the trigger.

In accomplishing these and other objects of the invention, I have provided improved details of structure, a preferred form of which is shown in the accompanying drawings, in which:

Figure 1 is a top plan view of a portion of a hot bed equipped with turning devices constructed in accordance with the present invention;

Figure 2 is an end elevational view on a larger scale of a portion of the hot bed;

Figure 3 is a top plan view on a still larger scale of one of the hot bed carriages to which my turning device is applied;

Figure 4 is a side elevational view of the carriage shown in Figure 3;

Figure 5 is a vertical sectional view taken substantially on line V—V of Figure 3, but showing in addition part of the foundation structure;

Figure 6 is a fragmentary top plan view of the end portion of one of the carriages;

Figure 7 is a side elevational view of one of the carriages equipped with my turning device showing the first stage in the operation of the latter;

Figure 8 is a view similar to Figure 7, but showing the next stage;

Figure 9 is another view similar to Figure 7, but showing the stage following that shown in Figure 8;

Figure 10 is another view similar to Figure 7, but showing the stage following Figure 9; and Figure 11 is another view similar to Figure 7, but showing the final stage.

Figures 1 and 2 show a portion of a typical hot bed which includes a foundation 10 and a series of spaced apart parallel rails 12 supported thereby. Between each successive pair of rails the foundation carries a channel 13, which serves as a walkway, and a second channel 14, which serves as a carriage track (Figure 2). The bed includes two series of carriages 15 and 16 located adjacent its entry and exit ends respectively. The carriages 15 are supported in every second track 14 and the carriages 16 in the remaining tracks 14. Both sets of carriages are propelled by cables 17 and 18 connected to their front and rear ends respectively and operated by suitable drums, or winches, not shown, but situated beyond the ends of the rails.

The carriages 15 and 16 are all of similar construction, except for those to which my turning device is applied. As best shown in Figures 3, 5 and 6, each includes a body 19, a pair of tie rods 20 that extend the length of the body on opposite sides thereof, and end pieces 21 of T-shape in plan connected to said tie rods. The cables 17 and 18 are joined to these end pieces 21. Each carriage has a weighted dog 22 pivoted to its body 19 intermediate the length.

The entry end of the bed is at the right, as viewed in Figures 1 and 7 to 11, and the exit end at the left. Structural members, such as channels C, emerging from a hot mill, are placed on the rails 12 with their webs vertical and with adjacent members abutting (Figure 7). The carriages 15 move substantially in unison and are used to advance the whole row of members C toward the left and to stack incoming members against those already on the bed until about two thirds of the length of the bed is occupied. The dogs 22 furnish rigid abutments for pushing the members C forward when the carriages 15 advance (i. e. travel toward the exit end of the bed at the left), but pivot downwardly and pass under the members when the carriages retract (i. e. travel toward the entry end of the bed at the right). After each member C has advanced approximately two thirds the length of the bed, it is turned down counterclockwise, as viewed in Figures 7 to 11, to place its web horizontal. Thereafter the carriages 16, which also move in unison, are used to advance the member toward the left the remainder of the distance to the exit end of the bed.

In accordance with the present invention, automatic turning devices 23 are mounted on one or more of the carriages 16. As shown in Figures 3, 4 and 5, each turning device includes a bracket 24 of U-shape in end elevation welded or otherwise fixed to the side of the carriage body 19 to the right of the weighted dog 22 and straddling the tie rod 20. The bracket projects over the side edge of the track 14 and its upper face is channeled as indicated at 25. A lever 26 is pivoted to the bracket at 27 within the channeled portion and can occupy either a prone position in which it rests against the front portion of the bracket, as shown in full lines in Figure 4, or a substantially upright position shown in dot-dash lines in this figure. The rear portion of the upper face of the bracket 24 carries an adjustable stop 28 which the lever 26 abuts in its upright position. If desired the bracket can carry snubber means, not shown, to prevent rebound of the lever when it strikes the stop. A dog 30 is pivoted to the lever 26 on a fastener 31, which can be inserted through any one of a series of openings 32 in the lever. The dog is U-shaped in end elevation and straddles the lever. Consequently the dog can occupy a position in which it is folded against the lever, as shown in full lines in Figure 4, or a second position in which it extends outwardly and rearwardly therefrom, as shown in dot-dash lines in this figure.

As the carriages 16 retract toward the row of structural members C on the hot bed, the lever 26 automatically assumes its upright position. The means for thus moving the lever includes a resetting trigger 33 which is pivoted to the lower end of the lever in a rabbet 34 and extends through a slot 35 in the bottom of the bracket 24 (Figure 4). The exterior of the carriage track carries a stationary abutment 36, which preferably can be folded down out of the way when the turning device is not used. When the lever 26 is prone, the front or left face of the trigger 33 abuts the wall of the rabbet 34. When the carriage 16 advances to a position where the trigger 33 engages the abutment 36, such engagement swings the lever 26 clockwise, as viewed in Figure 4, from its prone to its upright posiiton. Thereafter the trigger 33 is free to pivot in either direction relative to the lever 26 so that the carriage can move back and forth across the abutment without moving said lever.

In operation, assume there is a row of channels C on the hot bed with their webs vertical and their flanges directed toward the exit end of the bed, and also that the carriages 16 are in the position shown in Figure 7. At this time the carriages 16 are retracting toward these channels (i. e. moving to the right) and the levers 26 (one or more) are swinging clockwise to their upright positions as just described. When the levers reach this position, their dogs 30 are balanced to drop to their extended positions shown in Figure 8. When the device is set up for structural members of any particular size, the dogs 30 are located relative to the lever 26 and the stop 28 adjusted so that the dogs in their extended position are at a height to engage under the upper flanges of the members.

As the carriages 16 retract, they arrive at a position where the dogs 30 engage under the flange of the first channel, as shown in Figure 8. Further retraction swings the lever 26 counterclockwise as shown in Figure 9. The dog now carries the first channel to a position where its web is horizontal, as shown in Figure 10. The channels behind the first furnish a firm backstop to enable the first to be downturned. The lever 26 now assumes its prone position shown in Figure 10 and the dog 30 is balanced to drop to its folded position, whereupon these parts pass freely under the remaining upright channels. Retraction of the carriages 16 continues until their weighted dogs 22 are behind the downturned channel. Thereafter movement of the carriages is reversed as shown in Figure 11, and they are advanced to push the downturned channel to the left and off the exit end of the hot bed. When the carriages advance, the resetting trigger 33 passes freely over the abutment 36 without moving the lever 26. After the channel is pushed from the bed, the carriages 16 retract, and the action just described is repeated.

From the foregoing description it is seen that my invention furnishes a simple device for automatically turning channels or beams on a hot bed and eliminating costly and hazardous manual operations. The device is readily installed on existing equipment, and is easily rendered inoperative when not needed, as when the hot bed is used for cooling rounds or the like.

While I have shown and described only a single embodiment of the invention, it is apparent that modifications may arise. Therefore I do not wish to be limited to the disclosure set forth but only by the scope of the appended claims.

I claim:

1. In a hot bed which includes a plurality of parallel rails for supporting structural members of the type having webs and flanges, and carriages movably supported between said rails for moving the members therealong, the combination therewith of a device for turning the members from a position in which their webs are vertical to a position in which their webs are horizontal comprising a lever pivotally mounted on one of said carriages and adapted to occupy a prone position or an upright position, a dog pivoted to said lever and adapted in the upright position thereof to engage under the flange of a member resting on said rails with its web vertical, and in the prone position of said lever to pass underneath members resting on said rails, and means for resetting said lever from its prone to its upright position after turning a member.

2. In a hot bed which includes a plurality of parallel rails for supporting structural members of the type having webs and flanges, and carriages movably supported between said rails for moving the members therealong, the combination therewith of a device for turning the members from a position in which their webs are vertical to a position in which their webs are horizontal comprising a lever pivotally mounted on one of said carriages and adapted to occupy a prone position or an upright position, a dog mounted on said lever and adapted in the upright position thereof to engage under the flange of a member resting on said rails with its web vertical, and in the prone position of said lever to pass underneath members resting on said rails, a trigger mounted on said lever, and an abutment fixed to said bed, said trigger being cooperable with said abutment for resetting said lever from its prone to its upright position after turning a member.

3. A combination as defined in claim 1 in which said dog is balanced to move to an extended position when said lever is in its upright position and to a folded position when said lever is in its prone position.

4. A combination as defined in claim 1 in which said dog is adjustable vertically and the upright positon of said lever is angularly adjustable to accommodate the turning device for different sizes of structural members.

5. In a hot bed which includes a plurality of parallel rails for supporting structural members of the type having webs and flanges, and carriages movably supported between said rails for moving the members therealong, the combination therewith of a device for turning the members from a position in which their webs are vertical to a position in which their webs are horizontal comprising a bracket fixed to the side of one of said carriages, a lever pivoted to said bracket and adapted to occupy a prone position or an upright position, stop means on said bracket abutted by said lever in its upright position, a dog pivoted to said lever and balanced to move to an extended position when said lever is in its upright position and to a folded position when said lever is in its prone position, said dog in its extended position being adapted to engage under the flange of a member resting on said rails with its web vertical, and in its folded position to pass underneath members resting on said rails, and means for resetting said lever from its prone to its upright position after turning a member.

6. A combination as defined in claim 5 in which said resetting means includes a trigger pivoted to the lower end of said lever and extending beneath said bracket and an abutment fixed to the bed and cooperable with said trigger.

7. A combination as defined in claim 5 in which said bracket carries snubber means with which said lever is engageable to prevent its rebounding or striking said stop means.

8. A combination as defined in claim 5 in which said dog is adjustable vertically and said stop means is adjustable to accommodate the turning device for different sizes of structural members.

References Cited in the file of this patent

FOREIGN PATENTS 488,858     France     Nov. 21, 1918